(12) United States Patent
Adkins et al.

(10) Patent No.: US 11,505,487 B2
(45) Date of Patent: Nov. 22, 2022

(54) METHOD FOR DECREASING BUBBLE LIFETIME ON A GLASS MELT SURFACE

(71) Applicant: CORNING INCORPORATED, Corning, NY (US)

(72) Inventors: Laura Rose VanCott Adkins, Corning, NY (US); Soon-yong Choi, Guri-si (KR); Megan Aurora DeLamielleure, Corning, NY (US); William Gurney Dorfeld, Salida, CO (US); Pierre Laronze, Corning, NY (US); Sang-ryoun Ryu, Seoul (KR)

(73) Assignee: Corning Incorporated, Corning, NY (US)

( * ) Notice: Subject to any disclaimer, the term of this patent is extended or adjusted under 35 U.S.C. 154(b) by 336 days.

(21) Appl. No.: 16/494,020

(22) PCT Filed: Mar. 16, 2018

(86) PCT No.: PCT/US2018/022857
§ 371 (c)(1),
(2) Date: Sep. 13, 2019

(87) PCT Pub. No.: WO2018/170392
PCT Pub. Date: Sep. 20, 2018

(65) Prior Publication Data
US 2021/0130213 A1    May 6, 2021

Related U.S. Application Data

(60) Provisional application No. 62/472,116, filed on Mar. 16, 2017.

(51) Int. Cl.
*C03B 5/23* (2006.01)
*C03B 5/225* (2006.01)
(Continued)

(52) U.S. Cl.
CPC .............. *C03B 5/225* (2013.01); *C03B 5/187* (2013.01); *C03B 7/07* (2013.01); *C03B 17/064* (2013.01)

(58) Field of Classification Search
None
See application file for complete search history.

(56) References Cited

U.S. PATENT DOCUMENTS 3,524,738 A    8/1970    Grubb et al.
4,704,153 A    11/1987   Schwenninger et al.
(Continued)

FOREIGN PATENT DOCUMENTS

CN    87105721 A    6/1988
CN    1306945 A     8/2001
(Continued)

OTHER PUBLICATIONS

Beerkens et al; "Gas Release and Foam Formation During Melting and Fining of Glass"; J. Am. Ceram. Soc. 89, 2435 (2006.
(Continued)

*Primary Examiner* — Jodi C Franklin
(74) *Attorney, Agent, or Firm* — Kevin M. Able

(57) ABSTRACT

A method of reducing bubble lifetime on the free surface of a volume of molten glass contained within or flowing through a vessel including a free volume above the free surface, thereby, minimizing re-entrainment of the bubbles back into the volume of molten glass and reducing the occurrence of blisters in finished glass products.

12 Claims, 5 Drawing Sheets

(51) Int. Cl.
*C03B 5/187* (2006.01)
*C03B 7/07* (2006.01)
*C03B 17/06* (2006.01)

(56) References Cited

U.S. PATENT DOCUMENTS

| | | | |
|---|---|---|---|
| 4,794,860 A | 1/1989 | Welton | |
| 4,944,595 A | 7/1990 | Hodson | |
| 5,785,726 A * | 7/1998 | Dorfeld | C03C 3/091 |
| | | | 65/157 |
| 5,820,989 A | 10/1998 | Reed et al. | |
| 6,553,787 B1 | 4/2003 | Akiho et al. | |
| 6,705,118 B2 * | 3/2004 | Simpson | F23L 7/00 |
| | | | 65/134.4 |
| 6,993,936 B2 * | 2/2006 | Grzesik | C03B 5/225 |
| | | | 65/134.9 |
| 8,991,215 B2 | 3/2015 | Shock et al. | |
| 9,096,452 B2 | 8/2015 | Charbonneau et al. | |
| 9,227,865 B2 | 1/2016 | Shock et al. | |
| 9,492,831 B2 | 11/2016 | Charbonneau et al. | |
| 2003/0196453 A1 * | 10/2003 | Roth | C03B 5/187 |
| | | | 65/29.12 |
| 2004/0177649 A1 * | 9/2004 | Dorfeld | C03B 5/43 |
| | | | 65/374.11 |
| 2004/0206126 A1 * | 10/2004 | Roth | C03B 5/187 |
| | | | 65/346 |
| 2005/0050923 A1 * | 3/2005 | Grzesik | C03B 5/163 |
| | | | 65/135.6 |
| 2005/0217317 A1 | 10/2005 | Lautenschlaeger et al. | |
| 2006/0042318 A1 * | 3/2006 | Burdette | C03B 5/16 |
| | | | 65/134.2 |
| 2006/0174655 A1 * | 8/2006 | Kobayashi | C03B 5/225 |
| | | | 65/134.5 |
| 2006/0242996 A1 * | 11/2006 | DeAngelis | C03B 5/1677 |
| | | | 65/134.1 |
| 2007/0022780 A1 * | 2/2007 | House | C03B 5/193 |
| | | | 65/29.21 |
| 2007/0149380 A1 * | 6/2007 | Dorfeld | C03B 5/225 |
| | | | 501/55 |
| 2009/0217708 A1 * | 9/2009 | DeAngelis | C03B 17/064 |
| | | | 65/157 |
| 2009/0320525 A1 | 12/2009 | Johnson | |
| 2010/0018251 A1 | 1/2010 | Lautenschlaeger et al. | |
| 2010/0126225 A1 * | 5/2010 | Ding | B01F 15/00954 |
| | | | 65/135.3 |
| 2011/0203321 A1 * | 8/2011 | De Angelis | C03B 5/163 |
| | | | 65/45 |
| 2012/0125050 A1 * | 5/2012 | Murakami | C03B 17/064 |
| | | | 65/90 |
| 2014/0356628 A1 * | 12/2014 | Biswas | C03C 3/093 |
| | | | 428/410 |
| 2014/0377525 A1 * | 12/2014 | Kawaguchi | C03C 3/091 |
| | | | 428/220 |
| 2015/0197440 A1 * | 7/2015 | Shock | C03B 5/202 |
| | | | 65/134.4 |
| 2017/0341965 A1 * | 11/2017 | Claussen | C03B 5/2252 |
| 2020/0199012 A1 * | 6/2020 | Hayashi | C03C 3/087 |
| 2021/0094859 A1 * | 4/2021 | Wang | C03B 5/225 |

FOREIGN PATENT DOCUMENTS

| | | |
|---|---|---|
| CN | 101506109 A | 8/2009 |
| CN | 102076618 A | 5/2011 |
| CN | 102503081 A | 6/2012 |
| CN | 202785956 U | 3/2013 |
| CN | 103118993 A | 5/2013 |
| CN | 204689869 U | 10/2015 |
| CN | 204999795 U | 1/2016 |
| CN | 105377774 A | 3/2016 |
| CN | 205387539 U | 7/2016 |
| CN | 205556444 U | 9/2016 |
| CN | 106746497 A | 5/2017 |
| DE | 102009002336 A1 | 10/2010 |
| EP | 0253188 A1 | 1/1988 |
| EP | 0713481 A1 | 5/1996 |
| GB | 741606 A | 12/1955 |
| JP | 63-025226 A | 2/1988 |
| JP | 64042608 A | 2/1989 |
| JP | 2001-233629 A | 8/2001 |
| JP | 2006347828 A | 12/2006 |
| JP | 2009091244 A | 4/2009 |
| JP | 2010052968 A | 3/2010 |
| JP | 2010052971 A | 3/2010 |
| JP | 2011-079755 A | 4/2011 |
| JP | 2012017256 A | 1/2012 |
| JP | 2013075823 A | 4/2013 |
| JP | 2014009125 A | 1/2014 |
| JP | 2014-224024 A | 12/2014 |
| JP | 2016069252 A | 5/2016 |
| JP | 2016190753 A | 11/2016 |
| KR | 2015113887 A | 10/2015 |
| KR | 2015113897 A | 10/2015 |
| WO | 95/04709 A1 | 2/1995 |
| WO | 2008029649 A1 | 3/2008 |
| WO | 2008093580 A1 | 8/2008 |
| WO | 2009/157980 A2 | 12/2009 |
| WO | 2011007840 A1 | 1/2011 |
| WO | 2011078258 A1 | 6/2011 |
| WO | 2012/091133 A1 | 7/2012 |
| WO | 2014083923 A1 | 6/2014 |
| WO | 2015099143 A1 | 7/2015 |
| WO | 2015/197440 A1 | 12/2015 |

OTHER PUBLICATIONS

Helena Kocarkova; "Stability of Glass Foams: Experiments At the Bubble Scale and On Vertical Film"; Other [COND-MAT.Other], Universite Paris—EST, 2011. English. <NNT :2011PEST1092>. <tel-00664444.

International Search Report and Written Opinion of the International Searching Authority; PCT/US2018/022857; dated Oct. 16, 2018; 17 Pages; Korean Intellectual Property Office.

Van Der Schaaf et al; "A Model for Foam Formation, Stability, and Breakdown in Glass-Melting Furnaces"; Journal of Colloid and Interface Science; 295 (2006) pp. 218-229.

Kappel et al; "Foaming Behavior On Glass Melts" Glastech. Ber., vol. 60, pp. 189-201, 1987.

Parikh et al.; "Effect of Atmosphere On Surface Tension of Glass"; J. Am. Ceram. Soc., vol. 41, pp. 18-22, 1958.

Chinese Patent Application No. 201880029660.9, Office Action dated Nov. 3, 2021, 19 pages English Translation Only, Chinese Patent Office.

Japanese Patent Application No. 2019-550639, Office Action dated Sep. 27, 2021, 26 pages (16 pages of English Translation and 10 pages of Original Document), Japanese Patent Office.

* cited by examiner

METHOD FOR DECREASING BUBBLE LIFETIME ON A GLASS MELT SURFACE

CROSS-REFERENCE TO RELATED APPLICATIONS

This application claims the benefit of priority under 35 U.S.C. § 371 of International Application No. PCT/US18/22857, filed on Mar. 16, 2018 which claims the benefit of priority of U.S. Provisional Application Ser. No. 62/472,116 filed on Mar. 16, 2017 the contents of which are relied upon and incorporated herein by reference in their entirety as if fully set forth below.

BACKGROUND

Field

The present disclosure relates generally to methods for forming a glass article, and in particular for introducing a surfactant into a vessel to decrease bubble lifetime at the surface of a volume of molten glass within the vessel.

Technical Background

The manufacture of optical quality glass articles, such as glass substrates used in the manufacture of lighting panels, or liquid crystal or other forms of visual displays, involves high temperature processes that include the transport of molten glass through various conduits or vessels. Some of these conduits or vessels can contain a free volume, for example a gaseous atmosphere above a surface of the molten glass. Bubbles that may rise to the surface are commonly expected to pop quickly upon reaching the surface, but in some instances may not, thereby risking re-entrainment into the molten glass.

SUMMARY

Methods described herein are capable of modifying the surface tension of bubble membranes existing on the free surface of molten glass contained in and/or flowing through a vessel (e.g., conduit, container, tank, etc.), thereby reducing the lifetime of the bubbles on the surface of the molten glass and minimizing the possibility of re-entrainment of the bubble within the volume of molten glass. Thus, the occurrence of blisters (bubbles) in finished glass articles can be reduced.

Accordingly, a method of reducing bubble lifetime in molten glass is described, the method comprising forming molten glass in an electrically-boosted melting vessel, flowing the molten glass through a vessel downstream of the melting vessel, the downstream vessel containing a free volume between a free surface of the molten glass and a top of the downstream vessel. A humidified gas is flowed into the free volume, the humidified gas comprising at least one inert gas and water vapor. In embodiments, the humidified gas is not produced by combustion. For example, in embodiments, the humidified gas contains no carbon compounds, for example hydrocarbons or other carbon compounds.

A wall of the downstream vessel may be metallic (e.g., comprise metallic walls in contact with the molten glass). For example, the downstream vessel may comprise platinum, such as a platinum alloy.

The downstream vessel may be, for example, a molten glass conditioning vessel such as a fining vessel or a stirring vessel. In embodiments, the humidified gas is flowed into the fining vessel in a direction substantially parallel with a flow direction of the molten glass in the fining vessel.

A dew point of the humidified gas can be in a range from about 41° C. to about 92° C., for example in a range from about 60° C. to about 92° C.

A flow rate of the humidified gas can be in a range from greater than 0 to equal to or less than about 80 standard liters per minute (slpm), for example in a range from about 10 slpm to about 80 slpm.

The humidified gas may, for example, comprise an inert gas such as nitrogen or argon, although in further embodiments, the carrier gas may be another inert gas, for example a noble gas such as helium, neon or krypton, or combinations of any of the preceding inert gases.

A temperature of the molten glass in the downstream vessel can be equal to or greater than about 1300° C., for example equal to or greater than 1450° C. or equal to or greater than 1700° C., for example in a range from about 1300° C. to about 1720° C.

The average oxygen ($O_2$) content in the humidified gas can be in a range from about 10% to about 90% by volume, for example in a range from about 15% to about 90% by volume, in a range from about 20% to about 90% by volume, in a range from about 30% to about 90% by volume, in a range from about 40% to about 90% by volume, in a range from about 50% to about 90% by volume, in a range from about 60% to about 90% by volume, in a range from about 70% to about 90% by volume, in a range from about 80% to about 90% by volume, in a range from about 10% to about 80% by volume, in a range from about 10% to about 70% by volume, in a range from about 10% by volume to about 60% by volume, in a range from about 10% by volume to about 50% by volume, in a range from about 10% by volume to about 40% by volume, in a range from about 10% by volume to about 30% by volume, or in a range from about 10% by volume to about 20% by volume, including all ranges and sub-ranges therebetween.

In some embodiments, the method may further comprise heating the humidified gas prior to flowing the humidified gas into the downstream vessel. For example, in some embodiments, the humidified gas may be heated to a temperature greater than the dew point prior to flowing the humidified gas into the downstream vessel.

In other embodiments, a method of reducing bubble lifetime in molten glass is described, comprising forming molten glass in an electrically-boosted melting vessel, flowing the molten glass through a downstream vessel downstream of the melting vessel, the downstream vessel containing a free volume between a free surface of the molten glass and a top of the downstream vessel, the molten glass comprising a bubble layer no greater than a single bubble deep on the free surface. A humidified gas is flowed into the free volume, such as from outside the vessel, the humidified gas comprising water vapor and at least some oxygen. In embodiments, the humidified gas is not produced by combustion (for example, not formed by submerged combustion in the melting vessel). In embodiments, the humidified gas contains no carbon compounds, for example hydrocarbons or other carbon compounds.

A wall of the downstream vessel, for example the entire vessel, can comprise platinum, for example a platinum alloy.

A dew point of the humidified gas can be in a range from about 41° C. to about 92° C.

A flow rate of the humidified gas can be in a range from greater than 0 to equal to or less than about 80 standard liters per minute (slpm), for example in a range from about 10 slpm to about 80 slpm.

The humidified gas may, for example, comprise an inert gas such as nitrogen or a noble gas, or combinations thereof.

The average oxygen ($O_2$) content in the humidified gas can be in a range from about 10% to about 90% by volume, for example in a range from about 15% to about 90% by volume, in a range from about 20% to about 90% by volume, in a range from about 30% to about 90% by volume, in a range from about 40% to about 90% by volume, in a range from about 50% to about 90% by volume, in a range from about 60% to about 90% by volume, in a range from about 70% to about 90% by volume, in a range from about 80% to about 90% by volume, in a range from about 10% to about 80% by volume, in a range from about 10% to about 70% by volume, in a range from about 10% by volume to about 60% by volume, in a range from about 10% by volume to about 50% by volume, in a range from about 10% by volume to about 40% by volume, in a range from about 10% by volume to about 30% by volume, or in a range from about 10% by volume to about 20% by volume, including all ranges and sub-ranges therebetween.

In some embodiments, a temperature of the molten glass in the downstream vessel can be equal to or greater than about 1300° C., for example equal to or greater than 1450° C. or equal to or greater than 1700° C., for example in a range from about 1300° C. to about 1720° C.

In still another embodiment, a method of reducing bubble lifetime in molten glass, comprising forming molten glass in an electrically-boosted melting vessel, directing the molten glass through a vessel downstream of the melting vessel, the molten glass comprising a plurality of bubbles on a free surface of the molten glass and reducing a surface tension gradient on membranes of the plurality of bubbles with a surfactant introduced into a free volume of the downstream vessel over the free surface. In accordance with some embodiments, the bubbles do not comprise a foam.

In embodiments, the step of introducing the surfactant comprises flowing a humidified gas not resulting from combustion into the free volume. The humidified gas can comprise at least one inert gas such as nitrogen, a noble gas, or combinations thereof.

In some embodiments, a wall of the downstream vessel, for example the entire vessel, can comprise platinum.

A dew point of the humidified gas is in a range from about 41° C. to about 92° C., for example in a range from about 60° C. to about 92° C.

In some embodiments, a flow rate of the humidified gas can be in a range from greater than 0 to equal to or less than about 80 standard liters per minute (slpm), for example in a range from about 10 slpm to about 80 slpm.

In some embodiments, a temperature of the molten glass in the downstream vessel can be equal to or greater than about 1300° C., for example equal to or greater than about 1450° C., for example in a range from about 1300° C. to about 1720° C.

The humidified gas is not formed by combustion.

In some embodiments, the downstream vessel is a fining vessel. In some embodiments, the downstream vessel is a stirring vessel.

In some embodiments, the downstream vessel is positioned between the stirring vessel and a forming body. For example, the downstream vessel may be a delivery vessel.

The method may further comprise directing the molten glass to a forming body and drawing the molten glass from the forming body as a ribbon.

In yet another embodiment, a method of reducing bubble lifetime in molten glass is disclosed, comprising forming molten glass in a melting vessel, flowing the molten glass through a vessel downstream of the melting vessel, the downstream vessel containing a free volume between a free surface of the molten glass and a top of the downstream vessel, the molten glass comprising at least one bubble on the free surface, and flowing a humidified gas into the free volume, wherein a partial pressure of oxygen in the humidified gas is equal to or greater than a partial pressure of oxygen in the at least one bubble.

Additional features and advantages of the embodiments disclosed herein will be set forth in the detailed description that follows, and in part will be readily apparent to those skilled in the art from that description or recognized by practicing embodiments as described herein, including the detailed description which follows, the claims, as well as the appended drawings.

It is to be understood that both the foregoing general description and the following detailed description present embodiments intended to provide an overview or framework for understanding the nature and character of the embodiments disclosed herein. The accompanying drawings are included to provide further understanding, and are incorporated into and constitute a part of this specification. The drawings illustrate various embodiments of the disclosure and together with the description serve to explain the principles and operations thereof.

DETAILED DESCRIPTION

Figure 1:
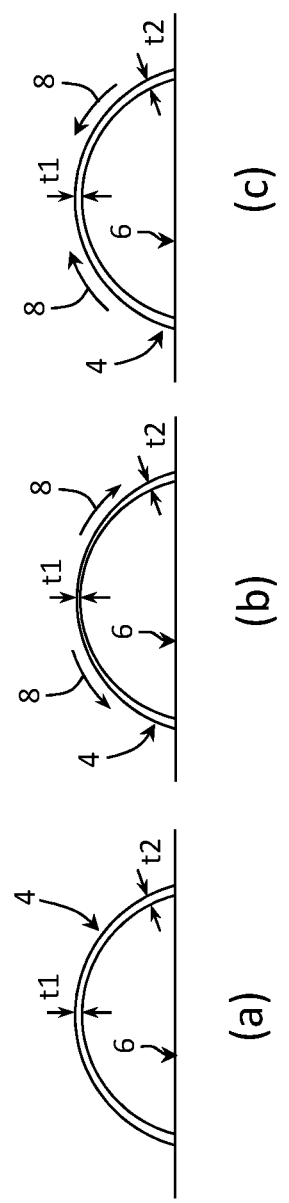
FIG. 1 comprises a sequence of schematic illustrations of a molten glass bubble as the bubble experiences the Marangoni effect.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as may be used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "free volume" in the context of a conduit or other vessel containing a molten material, such as molten glass, shall be construed as referring to a volume of the vessel unoccupied by molten glass. More particularly, the free volume extends between a surface of the molten glass within the vessel and a top of the vessel, and may contain, for example, one or more gases, vapors or other non-solid or non-liquid constituents. The free volume interfaces with the molten material at a "free surface" of the molten material. The molten material may be contained in the vessel, or be flowing through the vessel.

As used herein, "molten glass" shall be construed to mean a molten material which, upon cooling, can enter a glassy state. The term molten glass is used synonymously with the term "melt". The molten glass may form, for example, a majority silica glass, although the present disclosure is not so limited.

As used herein, the term "redox" refers to either one or both of a reducing chemical reaction or an oxidation chemical reaction.

As used herein, a refractory material is a non-metallic material having chemical and physical properties that make them applicable for structures, or as components of systems, that are exposed to environments above about 538° C.

Blisters (bubbles) in a final glass article can result in a reduced production yield, which is typically commercially undesirable. Bubbles in the glass can be removed, for example, by a fining process where the molten glass is heated to decrease a viscosity of the molten glass and the redox state of the molten glass is shifted to release additional oxygen into existing bubbles, causing the bubbles to grow. The increased buoyancy of the bubbles combined with the reduced viscosity of the molten glass facilitates a rise of the bubbles to the free surface of the molten glass, where the bubbles pop. Gas that was contained within the bubbles enters the free volume and can then leave the vessel, either through deliberate venting or through leaks or other outlets in the vessel.

Historically, bubble popping was assumed to occur very quickly after the bubbles reached the free surface of a glass melt. However, it has been found that bubbles can persist on the surface of a melt for sufficient time that the bubbles can exchange with a gaseous atmosphere above the melt and thereafter become re-entrained within the melt.

Analysis of blisters in finished glass articles has shown a significant proportion of $N_2$ gas. Because the glasses investigated did not otherwise contain appreciable amounts of dissolved nitrogen, and nitrogen is a majority gas often used in the atmosphere comprising the free volume of metallic vessels to reduce oxidation of the vessel, it is theorized that the blisters obtained their high $N_2$ gas content during exchange with the atmosphere above the melt, i.e., at a free surface of the melt. This requires persistence of the bubbles on the surface of the melt for a time sufficient to accommodate the gaseous exchange, and for the bubbles to re-enter the volume of molten glass and thereafter become fixed in the final glass product. Free surfaces that could potentially contribute to re-entrainment may be found, for example, in fining vessels and stirring vessels, although free surfaces may be found in other vessels as well. However, for bubbles in the melt to show up as blisters in the final glass article after reaching a free surface of the melt, the bubbles must first avoid popping as they sit on the free surface of the melt.

Within a pool of molten glass, bubble popping is preceded by drainage of the bubble membrane as the bubble sits on the surface of the melt. Drainage occurs by two principal means, regular drainage and irregular drainage. In regular drainage, the bubble membrane becomes thinner with time as the liquid comprising the bubble membrane drains back into the melt due to gravity. When sufficient material has drained from the membrane to cause the thickness of the membrane, particularly at the top of the bubble, to be reduced to a threshold thickness, the bubble pops. In irregular drainage, bands of molten material move across the surface of the membrane, and the membrane does not regularly decrease in thickness with time. Irregular drainage is thought to be caused by the Marangoni effect (Gibbs-Marangoni effect), wherein a surface tension gradient along the bubble membrane creates a flow of material from regions of low surface tension to regions of higher surface tension. The Marangoni effect can produce a flow that opposes gravity-induced drainage, keeping the bubble wall thickness, particularly at the top of the bubble, above the threshold thickness where popping occurs.

Without wishing to be bound by theory, it is thought that the high temperature within the molten glass-containing vessel, the presence of volatile constituents in the molten glass, and the generally singular (non-interconnected) nature of the bubbles within certain glass making processes result in a surface tension gradient on the bubble membrane. This gradient, owing to the Marangoni effect, produces a thickening of the bubble membrane, for example at the top of the bubble, that prolongs bubble lifetime on the surface of the melt. Referring to FIG. 1, a sequence of periods in bubble lifetime is shown. At (a), a bubble 4 is shown very shortly after the bubble reaches the free surface 6 of the molten glass. Bubble 4 is illustrated with a generally consistent membrane thickness between the top thickness t1 and the base thickness t2. At (b), the bubble membrane has begun to drain back into the melt, as indicated by arrows 8 and reflected by the noticeable thinning at the top of the bubble. It should be noted that at high temperatures, various chemical constituents of the glass melt can be lost at free surfaces of the melt due to volatilization. When certain chemical constituents, such as boron, are lost, the surface tension of the molten glass is increased. Other volatilizable constituents can include alkali (Li, Na, K, Rb, Cs and Fr) and alkali earths (Be, Mg, Ca, Sr, Ba and Ra). Additional volatilizable constituents can include V, Ti and F. The volatilization of constituents from the melt is accentuated in the bubble membrane when compared with the free surface of the molten glass because the bubble membrane is largely isolated from the bulk melt and includes an atmosphere on both sides of the membrane. More importantly, thinning of the bubble membrane at the top of the bubble due to initial draining means the volatilization of constituents at the top of the bubble has a greater impact on surface tension at the top of the bubble than the volatilization of constituents at the base of the bubble membrane. This is so at least because the thinner portion of the membrane will lose the volatilizable constituent(s) faster than the thicker portion of the membrane, and therefore proportionally will experience a greater change in surface tension than the base of the bubble membrane. For example, the path for release of volatile constituents from an interior of the bubble membrane to a surrounding atmosphere is shorter for the thin membrane portion than for the thicker membrane portion. The resulting surface tension gradient formed between the upper (top) portion of the bubble and the base of the bubble closest to the bulk melt surface is what facilitates the Marangoni effect. Accordingly, at (c), the flow 8 of molten glass has reversed, with molten glass flowing to the top of the bubble rather than draining, thereby increasing the top thickness t1 compared, for example, to (b). Unaddressed, the Marangoni effect can cause and/or prolong irregular drainage and extend bubble lifetimes. It can be appreciated therefore that raising local temperatures to reduce viscosity to aid bubble drainage and induce popping can, conversely, worsen the Marangoni effect and extend bubble lifetime.

It is known to establish a humid atmosphere in contact with an outside of a metallic vessel containing molten glass. That is, an atmosphere comprising water vapor is put in contact with an outside wall of the vessel, opposite the molten glass. This is particularly the case for platinum-containing vessel walls used in the manufacture of optical quality glass articles. The partial pressure of hydrogen on the outside of the vessel resulting from the presence of the humid atmosphere that is equal to or greater than the partial pressure of hydrogen within the vessel (i.e., within the molten glass) prevents a flow of hydrogen through the metal wall from the molten glass, thereby preventing the formation of oxygen blisters at the molten glass-metallic wall interface. In accordance with the present disclosure, it has been found that humidity in an atmosphere above the melt, that is to say within the free volume of the vessel (inside the vessel) can act as a surfactant, reducing the surface tension gradient of the bubble membrane and reducing or avoiding the Marangoni effect, irregular drainage, and the resultant extended bubble lifetimes.

Figure 2:
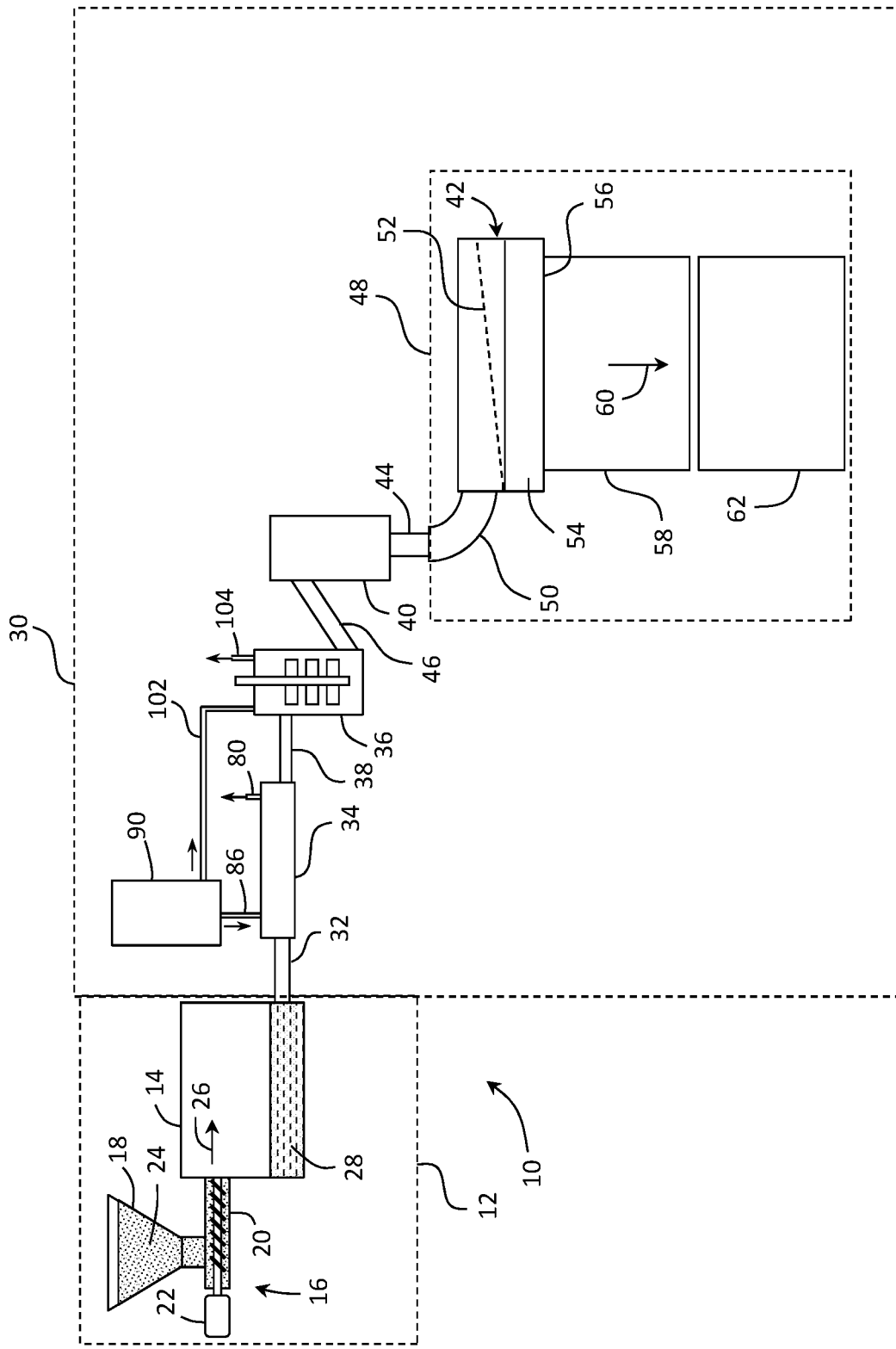
FIG. 2 is a schematic view of an exemplary glass making apparatus according to embodiments of the disclosure.

Shown in FIG. 2 is an exemplary glass manufacturing apparatus 10. In some embodiments, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners and/or electrodes) configured to heat raw material and convert the raw material into molten glass. For example, melting furnace 14 may be an electrically-boosted melting vessel, wherein energy is added to the raw material through both combustion burners and by direct heating, wherein an electric current is passed through the raw material, and thereby adding energy via Joule heating of the raw material. As used herein, an electrically-boosted melting vessel is a melting vessel that obtains heat energy from both Joule heating and above-the-glass-surface combustion heating, and the amount of energy imparted to the raw material and/or melt via Joule heating is equal to or greater than about 20% of the total energy added to the melt. As used herein, an electrically-boosted melting vessel does not include submerged combustion processes wherein combustion occurs beneath a surface of the melt.

In further embodiments, glass melting furnace 12 may include thermal management devices (e.g., insulation components) that reduce heat loss from the melting vessel. In still further embodiments, glass melting furnace 12 may include electronic devices and/or electromechanical devices that facilitate melting of the raw material into a glass melt. Still further, glass melting furnace 12 may include support structures (e.g., support chassis, support member, etc.) or other components.

Glass melting vessel 14 is typically formed from a refractory material, such as a refractory ceramic material, for example a refractory ceramic material comprising alumina or zirconia, although the refractory ceramic material may comprise other refractory materials, such as yttrium (e.g., yttria, yttria stabilized zirconia, yttrium phosphate), zircon (ZrSiO4) or alumina-zirconia-silica or even chrome oxide, used either alternatively or in any combination. In some examples, glass melting vessel 14 may be constructed from refractory ceramic bricks.

In some embodiments, melting furnace 12 may be incorporated as a component of a glass manufacturing apparatus configured to fabricate a glass article, for example a glass ribbon of an indeterminate length, although in further embodiments, the glass manufacturing apparatus may be configured to form other glass articles without limitation, such as glass rods, glass tubes, glass envelopes (for example, glass envelopes for lighting devices, e.g., light bulbs) and glass lenses, although many other glass articles are contemplated. In some examples, the melting furnace may be incorporated as a component of a glass manufacturing apparatus comprising a slot draw apparatus, a float bath apparatus, a down draw apparatus (e.g., a fusion down draw apparatus), an up draw apparatus, a pressing apparatus, a rolling apparatus, a tube drawing apparatus or any other glass manufacturing apparatus that would benefit from the present disclosure. By way of example, FIG. 2 schematically illustrates glass melting furnace 12 as a component of a fusion down draw glass manufacturing apparatus 10 for fusion drawing a glass ribbon for subsequent processing into individual glass sheets or rolling the glass ribbon onto a spool.

Glass manufacturing apparatus 10 (e.g., fusion down draw apparatus 10) can optionally include an upstream glass manufacturing apparatus 16 positioned upstream relative to glass melting vessel 14. In some examples, a portion of, or the entire upstream glass manufacturing apparatus 16, may be incorporated as part of the glass melting furnace 12.

As shown in the embodiment illustrated in FIG. 1, the upstream glass manufacturing apparatus 16 can include a raw material storage bin 18, a raw material delivery device 20 and a motor 22 connected to the raw material delivery device. Storage bin 18 may be configured to store a quantity of raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 can be powered by motor 22 such that raw material delivery device 20 delivers a predetermined amount of raw material 24 from the storage bin 18 to melting vessel 14. In further examples, motor 22 can power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, in an initial melting step, raw material is added to the melting vessel as particulate, for example as comprising various "sands". Raw material may also include scrap glass (i.e. cullet) from previous melting and/or forming operations. Combustion burners are typically used to begin the melting process. In an electrically boosted melting process, once the electrical resistance of the raw material is sufficiently reduced (e.g., when the raw materials begin liquefying), electric boost is begun by developing an electric potential between electrodes positioned in contact with the raw materials, thereby establishing an electric current through the raw material, the raw material typically entering, or in, a molten state at this time.

Glass manufacturing apparatus 10 can also optionally include a downstream glass manufacturing apparatus 30 positioned downstream of glass melting furnace 12 relative to a flow direction of the molten glass 28. In some examples, a portion of downstream glass manufacturing apparatus 30 may be incorporated as part of glass melting furnace 12. However, in some instances, first connecting conduit 32 discussed below, or other portions of the downstream glass manufacturing apparatus 30, may be incorporated as part of the glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium, or alloys thereof. For example, downstream components of the glass manufacturing apparatus may be formed from a platinum-rhodium alloy including from about 70% to about 90% by weight platinum and about 10% to about 30% by weight rhodium. However, other suitable metals can include molybdenum, rhenium, tantalum, titanium, tungsten and alloys thereof.

Downstream glass manufacturing apparatus 30 can include a first conditioning (i.e. processing) vessel, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may drive molten glass 28 through an interior pathway of first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel may be employed between the melting vessel and the fining vessel wherein molten glass from a primary melting vessel is further heated in a secondary vessel to continue the melting process, or cooled to a temperature lower than the temperature of the molten glass in the primary melting vessel before entering the fining vessel.

As described previously, bubbles may be removed from molten glass 28 by various techniques. For example, raw material 24 may include multivalent compounds (i.e. fining agents) such as tin oxide that, when heated, undergo a chemical reduction reaction and release oxygen. Other suitable fining agents include without limitation arsenic, antimony, iron and cerium, although as noted previously, the use of arsenic and antimony may be discouraged for environmental reasons in some applications. Fining vessel 34 is heated to a temperature greater than the melting vessel temperature, thereby heating the fining agent. Oxygen bubbles produced by the temperature-induced chemical reduction of one or more fining agents included in the melt rise through the molten glass within the fining vessel, wherein gases in the molten glass produced in the melting furnace during the melting process can coalesce or diffuse into the oxygen bubbles produced by the fining agent. The enlarged gas bubbles with increased buoyancy can then rise to a free surface of the molten glass within the fining vessel and thereafter be vented out of the fining vessel. The oxygen bubbles can further induce mechanical mixing of the molten glass in the fining vessel as they rise through the molten glass.

It should be noted that the bubbles at the surface of the molten glass in one or more vessels of the glass making apparatus, for example the fining vessel or the stirring vessel, generally rise as single bubbles and may form a layer of bubbles commonly thought of as no greater than a single bubble deep on the free surface of the molten glass. Some glass making processes, such as submerged combustion processes, can produce thick, persistent foam on the surface of the molten glass many bubbles deep and wherein the melt itself may include up to 30% voids. As used herein, foam is a collection of a large volume of gas separated by thin, interconnected membranes. Examples of foam are the head on a glass of beer and a bubble bath. On the other hand, bubbles reaching the free surface of the molten glass that are the subject of the present disclosure are typically singular in nature and rise through the molten glass much like bubbles in a glass of champagne, and are to be distinguished from the persistent, thick foam found in a melting furnace, or methods wherein a below-surface combustion process is being conducted. Moreover, above-surface combustion processes are undesirable within the metallic vessels of modern glass making apparatus designed for optical quality glass, such as the fusion process for sheet glass described herein, as the combustion flame could be detrimental to the vessel. It is noted that the methods described herein may be useful in addressing foam formation and persistence. However, effectiveness is reduced because only the surface layer of bubbles comprising the foam is exposed to the surfactant.

The downstream glass manufacturing apparatus 30 can further include another conditioning vessel, such as a mixing apparatus 36, for example a stirring vessel, for mixing the molten glass that flows downstream from fining vessel 34. Mixing apparatus 36 can be used to provide a homogenous glass melt, thereby reducing chemical or thermal inhomogeneities that may otherwise exist within the fined molten glass exiting the fining vessel. As shown, fining vessel 34 may be coupled to mixing apparatus 36 by a second connecting conduit 38. In some embodiments, molten glass 28 may be gravity fed from the fining vessel 34 to mixing apparatus 36 through second connecting conduit 38. For instance, gravity may drive molten glass 28 through an interior pathway of second connecting conduit 38 from fining vessel 34 to mixing apparatus 36. Typically, the molten glass within the mixing apparatus includes a free surface, with a free volume extending between the free surface and a top of the mixing apparatus. It should be noted that while mixing apparatus 36 is shown downstream of fining vessel 34 relative to a flow direction of the molten glass, mixing apparatus 36 may be positioned upstream from fining vessel 34 in other embodiments. In some embodiments, downstream glass manufacturing apparatus 30 may include multiple mixing apparatus, for example a mixing apparatus upstream from fining vessel 34 and a mixing apparatus downstream from fining vessel 34. These multiple mixing apparatus may be of the same design, or they may be of a different design from one another. In some embodiments, one or more of the vessels and/or conduits may include static mixing vanes positioned therein to promote mixing and subsequent homogenization of the molten material.

Downstream glass manufacturing apparatus 30 can further include another conditioning vessel such as delivery vessel 40 that may be located downstream from mixing apparatus 36. Delivery vessel 40 may condition molten glass 28 to be fed into a downstream forming device. For instance, delivery vessel 40 can act as an accumulator and/or flow controller to adjust and provide a consistent flow of molten glass 28 to forming body 42 through exit conduit 44. The molten glass within delivery vessel 40 can, in some embodiments, include a free surface, wherein a free volume extends upward from the free surface to a top of the delivery vessel. As shown, mixing apparatus 36 may be coupled to delivery vessel 40 by third connecting conduit 46. In some examples, molten glass 28 may be gravity fed from mixing apparatus 36 to delivery vessel 40 through third connecting conduit 46. For instance, gravity may drive molten glass 28 through an interior pathway of third connecting conduit 46 from mixing apparatus 36 to delivery vessel 40.

Downstream glass manufacturing apparatus 30 can further include forming apparatus 48 comprising the above-referenced forming body 42, including inlet conduit 50. Exit conduit 44 can be positioned to deliver molten glass 28 from delivery vessel 40 to inlet conduit 50 of forming apparatus 48. Forming body 42 in a fusion down draw glass making apparatus can comprise a trough 52 positioned in an upper surface of the forming body and converging forming surfaces 54 (only one surface shown) that converge in a draw direction along a bottom edge (root) 56 of the forming body. Molten glass delivered to the forming body trough via delivery vessel 40, exit conduit 44 and inlet conduit 50 overflows the walls of the trough and descends along the converging forming surfaces 54 as separate flows of molten glass. It should be noted that the molten glass within the forming body trough comprises a free surface, and a free volume extends from the free surface of the molten glass to the top of an enclosure within which the forming body is positioned. The flow of molten glass down at least a portion of the converging forming surfaces is intercepted and directed by a dam and edge directors. The separate flows of molten glass join below and along the root to produce a single ribbon of molten glass 58 that is drawn in a draw direction 60 from root 56 by applying a downward tension to the glass ribbon, such as by gravity, edge rolls and pulling rolls (not shown), to control the dimensions of the glass ribbon as the molten glass cools and a viscosity of the material increases. Accordingly, glass ribbon 58 goes through a visco-elastic transition and acquires mechanical properties that give glass ribbon 58 stable dimensional characteristics. Glass ribbon 58 may in some embodiments be separated into individual glass sheets 62 by a glass separation apparatus (not shown) in an elastic region of the glass ribbon, while in further embodiments, the glass ribbon may be wound onto spools and stored for further processing.

Principals that are the subject of the present disclosure will now be described in the context of a fining vessel, with the understanding that such principals are not limited to a fining vessel and may be applied to other vessels comprising a free volume overtop a volume of molten glass, such vessels including stirring vessels, delivery vessels, and other vessels and/or conduits that contain and/or convey molten glass and may include a free volume. As used hereinafter, the term "vessels" will be considered to encompass both discrete processing vessels, for example fining vessels and stirring vessels, and conduits connecting such discrete processing vessels.

Figure 3:
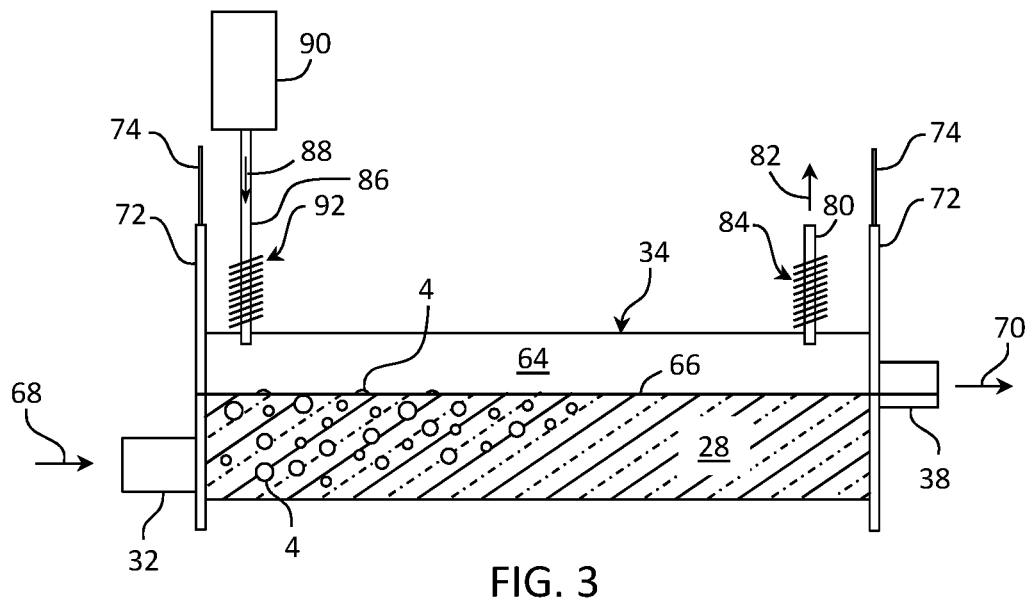
FIG. 3 is a cross sectional drawing of an exemplary fining vessel comprising a gas supply tube for providing a humidified carrier gas to the fining vessel.

FIG. 3 is a cross sectional side view of an exemplary fining vessel 34. Fining vessel 34 comprises a volume of molten glass 28 flowing therethrough, and a gaseous atmosphere contained within free volume 64 positioned above free surface 66 of molten glass 28. Molten glass flows into fining vessel at a first end, as indicated by arrow 68, and flows out an opposing second end, as indicated by arrow 70. For example, molten glass can flow into fining vessel 34 via conduit 32, and out of fining vessel 34 via conduit 38. The molten glass within the fining vessel is heated to a temperature greater than the melting temperature, for example in a range from about 1600° C. to about 1700° C., such as in a range from about 1650° C. to 1700° C., typically by an electric current established within the vessel itself, although in further embodiments, the fining vessel can be heated by other means, for example by external heating elements (not shown). In some embodiments, the molten glass may be heated to a temperature greater than 1700° C., such as up to about 1720° C.

As shown in FIG. 3, fining vessel 34 can comprise flanges 72, for example at least two flanges, in electrical communication with an electric power source (not shown) through respective electrodes 74 such that an electric current is established between the flanges and within the intervening wall or walls of the fining vessel. In some embodiments, a multitude of flanges may be used, for example three flanges, four flanges, or even five flanges or more, wherein the vessel can be thermally divided into a plurality of temperature zones by differential localized heating of the temperature zones. The increased buoyancy of the bubbles due to bubble growth, and reduced viscosity of the molten glass as a result of the temperature increase, simultaneously increases upward force on the bubbles and decreases resistance to the upward rise of bubbles 76 within the molten glass, thereby facilitating the rise of the bubbles to free surface 66. At free surface 66, the bubbles may pop, and the gas contained therein released into free volume 64. The gas may, in some embodiments, be thereafter vented out of the fining vessel via optional vent tube 80, as indicated by arrow 82. In embodiments, vent tube 80 may be heated, for example by one or more heating elements such as external electrical resistance heating element(s) 84, although in further embodiments, vent tube 80 may be heated by establishing an electric current directly within the vent tube in a manner similar to fining vessel 34. However, as further described, some bubbles, upon reaching free surface 66, may not pop during a relatively prolonged residence time at free surface 66 for reasons previously described, and may become re-entrained within the molten glass flowing through the fining vessel.

In accordance with embodiments described herein, a humidified gas 88 can be injected into free volume 64 above free surface 66 via fining vessel gas supply tube 86 in fluid communication with a humidifier 90. Humidified gas 88 comprises water vapor and oxygen ($O_2$), and can further comprise a non-combustible carrier gas. While the humidifier 90 of FIG. 2 is shown connected to fining vessel 34 and mixing apparatus 36 (discussed herein below), individual humidifiers may be used such that fining vessel 34 and/or mixing apparatus 36, and/or any other vessel, is supplied with a humidified gas by individual, dedicated humidifiers, or a combination of individual and communal humidifiers. As used herein a non-combustible carrier gas does not include hydrocarbons and/or is not formed as a by-product of combustion during the glass making process, and may comprise, for example, an inert gas such as nitrogen, although in further embodiments, the carrier gas may be another inert gas, for example a noble gas such as helium, neon, argon, krypton, xenon, etc., or combinations of any of the preceding inert gases. For example, in embodiments neither the carrier gas, nor any component of the humidified gas in general, originates from a submerged combustion burner in the glass making process (e.g., melting vessel) that relies on the combustion of a fuel, for example natural gas, as a source of humidity (e.g., water vapor).

The average oxygen ($O_2$) content of the humidified gas should be equal to or greater than the oxygen content in the bubbles to ensure no outward diffusion of oxygen from the bubbles. That is, the partial pressure of oxygen in the atmosphere outside the bubbles should at least be equal to the partial pressure of oxygen within the bubbles. Outward diffusion of oxygen from the bubbles into the surrounding atmosphere can lead to bubble shrinkage and subsequent bubble wall thickness. Thickened bubbles walls can prolong bubble popping for a time sufficient to allow the bubbles to become re-entrained within the glass flow. Thus, in some embodiments, the partial pressure of oxygen within the humidified gas can be greater than the partial pressure of oxygen in the bubbles to ensure bubble expansion.

The average oxygen content of oxygen in the humidified gas can, for example, be in a range from about 10% to about 90% by volume, for example in a range from about 15% to about 90% by volume, in a range from about 20% to about 90% by volume, in a range from about 30% to about 90% by volume, in a range from about 40% to about 90% by volume, in a range from about 50% to about 90% by volume, in a range from about 60% to about 90% by volume, in a range from about 70% to about 90% by volume, in a range from about 80% to about 90% by volume, in a range from about 10% to about 80% by volume, in a range from about 10% to about 70% by volume, in a range from about 10% by volume to about 60% by volume, in a range from about 10% by volume to about 50% by volume, in a range from about 10% by volume to about 40% by volume, in a range from about 10% by volume to about 30% by volume, or in a range from about 10% by volume to about 20% by volume, including all ranges and sub-ranges therebetween. In some embodiments, the humidified gas can comprise air.

In some embodiments, the presence of water vapor as a surfactant can counter the effect of a lower partial pressure of oxygen outside the bubble wall than inside the bubble wall. It should be understood, therefore, that a goal is to prevent bubble shrinkage, which can thicken the bubble wall and prolong bubble persistence (delay bubble popping). Accordingly, the amount of oxygen and water vapor can be adjusted to prevent bubble shrinkage, which, in some embodiments can result in a partial pressure of oxygen outside the bubble that is less than the partial pressure of oxygen inside the bubble.

It should also be noted that vessels that operate at lower temperatures, for example a stirring vessel, may tolerate higher oxygen concentrations without undue oxidation of the vessel wall(s) than, for example, a higher operating temperature vessel such as a fining vessel.

A dew point of the humidified gas can be in a range from about 41° C. to about 92° C., for example in a range from about 60° C. to about 92° C. The remainder of the humidified gas can be the inert carrier gas.

A flow rate of the humidified gas can be in a range from greater than 0 to about 80 slpm, for example in a range from about 10 slpm to about 80 slpm, in a range from about 20 slpm to about 80 slpm, in a range from about 30 slpm to about 80 slpm, such as in a range from about 40 slpm to about 80 scfm, in a range from about 50 slpm to about 80 slpm, in a range from about 60 slpm to about 80 slpm, in a range from about 70 slpm to about 80 slpm, in a range from about 10 slpm to about 70 slpm, in a range from about 10 slpm to about 60 slpm, in a range from about 10 slpm to about 50 slpm, in a range from about 10 slpm to about 40 slpm, in a range from about 10 slpm to about 30 slpm, or in a range from about 10 slpm to about 20 slpm.

In some embodiments, fining vessel gas supply tube 86 may be heated, thereby heating the humidified gas supplied to fining vessel 34. For example, fining vessel gas supply tube 86 and thereby humidified gas 88 may be heated by one or more heating elements such as external electrical resistance heating element(s) 92, although in further embodiments, fining vessel gas supply tube 86 may be heated by establishing an electric current directly within the fining vessel gas supply tube in a manner similar to the method of heating fining vessel 34. For example, fining vessel gas supply tube 86 may include one or more flanges in electrical communication with an electrical power source as described in respect of fining vessel 34.

Figure 4:
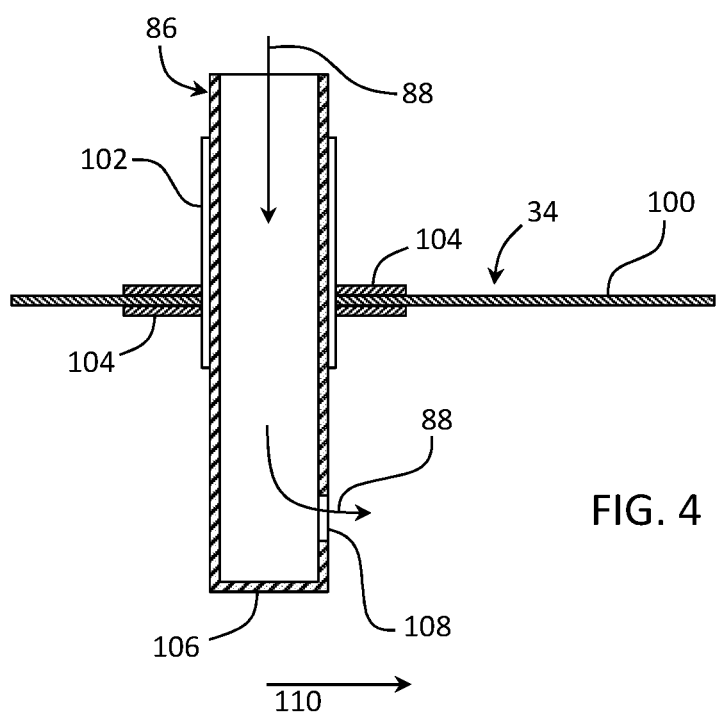
FIG. 4 is a detailed cross sectional view of an exemplary gas supply tube for providing a humidified carrier gas to a fining vessel.

FIG. 4 is a cross sectional view of an exemplary fining vessel gas supply tube 86 shown penetrating a wall 100 of fining vessel 34 above the free surface 66 of molten glass 28 (not shown). Fining vessel gas supply tube 86 is shown extending through a reinforcing sleeve 102 where the fining vessel gas supply tube penetrates fining vessel wall 100. In addition, reinforcing plates 104 are depicted encircling reinforcing sleeve 102 and located above and below fining vessel wall 100 and attached thereto. Reinforcing plates 104, reinforcing sleeve 102 and fining vessel wall 100 can be attached to each other, such as by welding. For example, reinforcing plates 104 can be welded to fining vessel wall 100 and to reinforcing sleeve 102. In addition, in embodiments, reinforcing sleeve 102 can be welded to fining vessel gas supply tube 86. Reinforcing plates 104 and reinforcing sleeve 102 provide additional thickness to the fining vessel wall and to fining vessel gas supply tube 86 where the fining vessel gas supply tube penetrates the fining vessel, since all can be formed of thin sheets of a platinum alloy and easily deformed as the metal expands during initial heating up of the system.

Fining vessel gas supply tube 86 comprises a closed bottom 106 and an exhaust port 108 located on the side wall of the fining vessel gas supply tube near the bottom of the fining vessel gas supply tube and oriented such that humidified gas is exhausted from the fining vessel gas supply tube in a direction substantially parallel with a flow direction 110 of the molten glass within fining vessel 34 (e.g., oriented in a downstream direction). Substantially parallel flow of humidified gas and molten glass minimizes or eliminates direct impingement of the humidified gas being exhausted from the gas supply tube onto the surface of the molten glass and subsequent cooling of molten glass surface. Such cooling could cause viscosity inhomogeneities in the molten glass that could manifest as defects in the finished product. In addition, a side-ported fining vessel gas supply tube reduces the probability that condensates, such as glass constituents like easily-volatilized boron, can accumulate in the exhaust port and eventually drop into the molten glass below.

Figure 5:
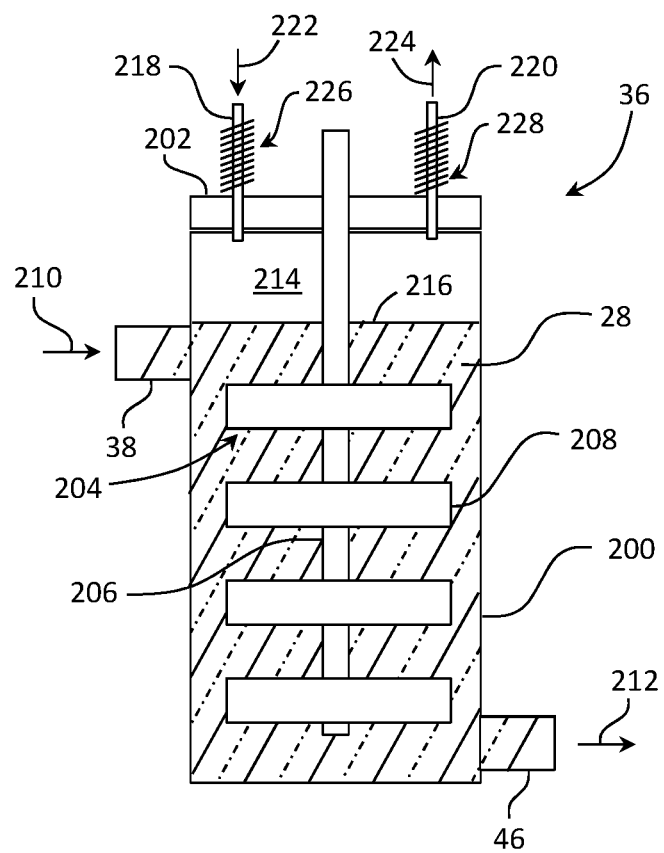
FIG. 5 is a cross sectional drawing of an exemplary stirring vessel comprising an inlet for providing a humidified carrier gas to a stirring vessel.

In some embodiments, mixing apparatus 36 may be supplied with a humidified gas, alternatively or in addition to fining vessel 34. FIG. 5 is a cross sectional view of an exemplary mixing apparatus 36. Mixing apparatus 36 includes stirring vessel 200, for example a stirring vessel, and a stirring vessel cover 202 positioned overtop stirring vessel 200. Mixing apparatus 36 further comprises a stirrer 204 rotatably mounted within the stirring vessel, stirrer 204 including a shaft 206 extending through stirring vessel cover 202 and a plurality of mixing blades 208 extending from shaft 206, at least a portion of stirrer 204 immersed in molten glass 28. Shaft 206 may be coupled to a motor (not shown), for example by a chain or gear drive apparatus that is used to rotate the stirrer. In the embodiment illustrated in FIG. 5, molten glass enters stirring vessel 200 via conduit 38, flows downward through the mixing blades of the rotating stirrer, and exits via conduit 46, as indicated by arrows 210 and 212, respectively. A free volume 214 may be positioned and maintained between a free surface 216 of molten glass 28 and vessel cover 202.

Mixing apparatus 36 may further comprise a stirring vessel gas supply tube 218 and an optional stirring vessel vent tube 220. In embodiments, one or both of stirring vessel gas supply tube 218, and stirring vessel vent tube 220 if present, can be arranged to extend through stirring vessel cover 202 and open into free volume 214 above free surface 216. A humidified gas 222 can be injected into the free volume 214 above free surface 216 within stirring vessel 200 via stirring vessel gas supply tube 218. Humidified gas 222 includes at least water vapor mixed with oxygen. As with the fining vessel, the partial pressure of oxygen in the atmosphere outside the bubbles may, in some embodiments, be at least equal to the partial pressure of oxygen within the bubbles and in some embodiments, the partial pressure of oxygen within the humidified gas can be greater than the partial pressure of oxygen in the bubbles to ensure bubble expansion, although in further embodiments, the presence of the water vapor can result in a tolerance for a partial pressure of oxygen outside the bubbles that is lower than the partial pressure of oxygen inside the bubbles, as long as bubble shrinkage does not occur.

Accordingly, the average oxygen content of the humidified gas provided to the stirring vessel can be in a range from about 10% to about 90% by volume, for example in a range from about 15% to about 90% by volume, in a range from about 20% to about 90% by volume, in a range from about 30% to about 90% by volume, in a range from about 40% to about 90% by volume, in a range from about 50% to about 90% by volume, in a range from about 60% to about 90% by volume, in a range from about 70% to about 90% by volume, in a range from about 80% to about 90% by volume, in a range from about 10% to about 80% by volume, in a range from about 10% to about 70% by volume, in a range from about 10% by volume to about 60% by volume, in a range from about 10% by volume to about 50% by volume, in a range from about 10% by volume to about 40% by volume, in a range from about 10% by volume to about 30% by volume, or in a range from about 10% by volume to about 20% by volume, including all ranges and sub-ranges therebetween. A dew point of the humidified gas can be in a range from about 41° C. to about 92° C., for example in a range from about 60° C. to about 92° C. The remainder of the humidified gas can be an inert carrier gas, for example nitrogen, or any of the noble gases, or combinations thereof.

A flow rate of the humidified gas 222 can be in a range from greater than 0 to about 80 slpm, for example in a range from about 10 slpm to about 80 slpm, in a range from about 20 slpm to about 80 slpm, in a range from about 30 slpm to about 80 slpm, such as in a range from about 40 slpm to about 80 scfm, in a range from about 50 slpm to about 80 slpm, in a range from about 60 slpm to about 80 slpm, in a range from about 70 slpm to about 80 slpm, in a range from about 10 slpm to about 70 slpm, in a range from about 10 slpm to about 60 slpm, in a range from about 10 slpm to about 50 slpm, in a range from about 10 slpm to about 40 slpm, in a range from about 10 slpm to about 30 slpm, or in a range from about 10 slpm to about 20 slpm. Gas within free volume 214 of stirring vessel 200 above free surface 216 can be exhausted through stirring vessel vent tube 220, as indicated by arrow 224.

It should be noted that although a fining agent is unlikely to provide significant oxygen bubbles while in the stirring vessel, bubbles may still rise to the surface of the molten glass within the stirring vessel, for example bubbles originating from within the melting vessel, or even bubbles re-entrained during the fining process. Additionally, volatilization of certain glass constituents, such as boron, can still occur within the stirring vessel.

In embodiments, stirring vessel gas supply tube 218 may be heated, thereby heating the humidified gas supplied to stirring vessel 200. For example, stirring vessel gas supply tube 218, and thereby humidified gas 222, may be heated by one or more heating elements such as external electrical resistance heating element(s) 226, although in further embodiments, stirring vessel gas supply tube 218 may be heated by establishing an electric current directly within the stirring vessel gas supply tube. In some embodiments, stirring vessel vent tube 220, if present, may be heated, for example by one or more heating elements such as external electrical resistance heating element(s) 228, although in further embodiments, stirring vessel vent tube 220 may be heated by establishing an electric current directly within the stirring vessel vent tube. In some embodiments, a stirring vessel vent tube may not be needed, wherein venting is obtained through leaks, e.g., between stirring vessel cover 202 and stirring vessel 200.

Figure 6:
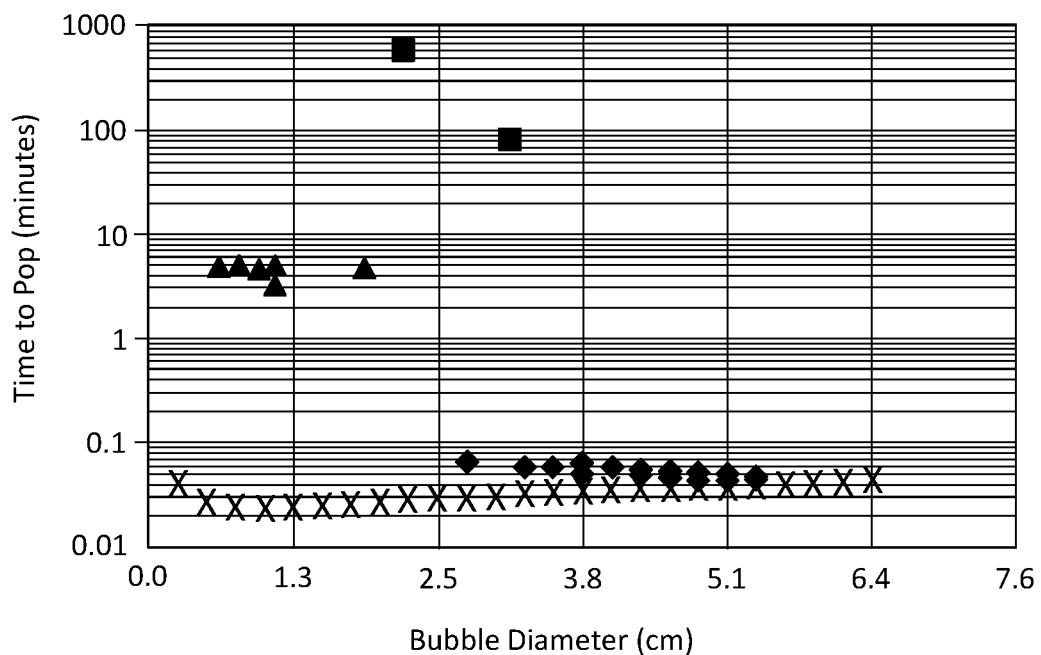
FIG. 6 is a chart showing measured pop (elimination) times for bubbles of varying diameters.

FIG. 6 is a chart of measured popping times for bubbles formed in molten Corning Eagle® XG® glass at approximately 1550° C. with various initial bubble gasses and cover gasses (wherein the bubble gas denotes gas contained within the bubbles, and the cover gas denotes the gas within the free volume, e.g., free volume 64 and/or 214). All bubbles exceeded the theoretical popping times, based on calculations that assume regular drainage. $O_2$ bubbles in a humid combustion cover atmosphere, denoted by diamonds, pop quickest, followed by bubbles blown using steam with a lab air cover gas, denoted by triangles, followed by bubbles blown using lab air in a lab air cover gas, denoted by squares. X's denote theoretical popping times assuming regular drainage. The data indicate that the presence of water at the bubble membrane, from either the bubble gas or the cover gas, appears to influence bubble popping times.

Figure 7:
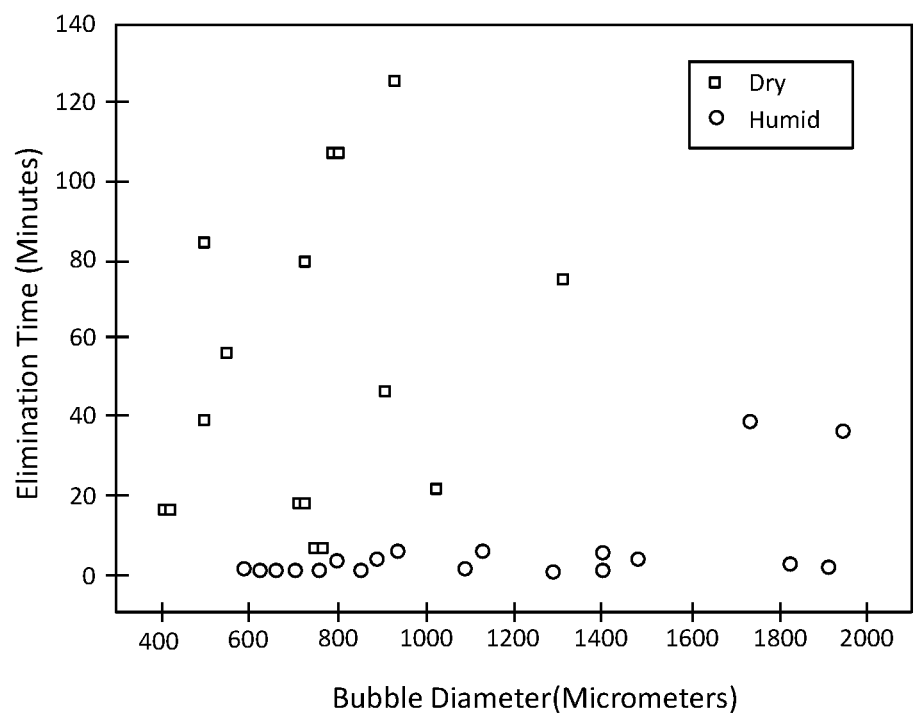
FIG. 7 is a plot of bubble elimination time as a function of bubble diameter for two different atmospheres over the bubbles, a dry air atmosphere and a humidified atmosphere.

FIG. 7 is a plot of bubble popping time (elimination time) as a function of bubble diameter for both a humid atmosphere (circles)) and a dry (un-humidified) atmosphere. The data show a significant decrease in bubble lifetime as a result of humidification of the atmosphere surrounding the bubbles. Glass melting was carried out in a quartz crucible, with the bubbles formed during the melting process. Air was flowed into the crucible, both dry air and humidified air, through an alumina tube. The quartz crucible was loaded into a high temperature observation furnace vertically, and in-situ observation of collected bubbles on the glass melt was carried out through a camera installed adjacent the quartz crucible. There are fewer bubbles over 1,000 µm (dry condition) shown in the plot because most of the bubbles (with diameters >1,000 µm) could not be eliminated within 140 minutes for the reason that the endurance of the quartz crucible at 1,600° C. was about 2 hours. After 2 hours the crucible began to deform and crystalize. The molten glass was a melt of Corning® XG®. The dry air had a dew point of 0° C., while a dew point of the humid air was 60° C.

It will be apparent to those skilled in the art that various modifications and variations can be made to embodiments of the present disclosure without departing from the spirit and scope of the disclosure. For example, while the preceding description centered on fining vessels and stirring vessels, the principals described herein can be applied to other vessels comprising molten glass with a free surface. Thus it is intended that the present disclosure cover such modifications and variations provided they come within the scope of the appended claims and their equivalents.

What is claimed is:

1. A method of reducing bubble lifetime in molten glass, comprising:
    forming molten glass in an electrically-boosted melting vessel;
    directing the molten glass through a vessel downstream of the melting vessel, the downstream vessel containing a free volume above a free surface of the molten glass in the downstream vessel; and
    flowing a humidified gas into the free volume, wherein the humidified gas comprises ≥10% $O_2$ by volume and a dew point in a range from 41° C. to 92° C.

2. The method according to claim 1, wherein the humidified gas comprises ≤90% $O_2$ by volume.

3. The method according to claim 1, wherein a temperature of the molten glass in the downstream vessel is equal to or greater than about 1300° C.

4. The method according to claim 1, further comprising heating the humidified gas prior to flowing the humidified gas into the downstream vessel.

5. The method according to claim 1, further comprising heating the humidified gas to a temperature greater than the dew point prior to flowing the humidified gas into the downstream vessel.

6. A method of reducing bubble lifetime in molten glass, comprising:
    forming molten glass in an electrically-boosted melting vessel;
    flowing the molten glass through a vessel downstream of the melting vessel, the downstream vessel containing a free volume between a free surface of the molten glass and a top of the downstream vessel, the molten glass comprising a bubble layer no greater than a single bubble deep on the free surface;
    flowing a humidified gas comprising oxygen into the free volume, wherein the humidified gas comprises ≥10% $O_2$ by volume and a dew point in a range from about 41° C. to about 92° C.

7. The method according to claim 6, wherein a wall of the downstream vessel comprises platinum.

8. The method according to claim 6, wherein a temperature of the molten glass in the downstream vessel is equal to or greater than about 1300° C.

9. The method according to claim 6, further comprising directing the molten glass to a forming body and drawing the molten glass from the forming body as a ribbon.

10. A method of reducing bubble lifetime in molten glass, comprising:
    forming molten glass in an electrically-boosted melting vessel;
    directing the molten glass through a vessel downstream of the melting vessel, the molten glass comprising a plurality of bubbles on a free surface of the molten glass;
    reducing a surface tension gradient on membranes of the plurality of bubbles with a surfactant introduced into a free volume of the downstream vessel over the free surface, wherein the surfactant comprises a humidified gas comprising 10% 02 by volume and a dew point in a range from about 41° C. to about 92° C.

11. The method according to claim 10, wherein a temperature of the molten glass in the downstream vessel is equal to or greater than about 1300° C.

12. The method according to claim 10, further comprising directing the molten glass to a forming body and drawing the molten glass from the forming body as a ribbon.

* * * * *

UNITED STATES PATENT AND TRADEMARK OFFICE
CERTIFICATE OF CORRECTION

PATENT NO. : 11,505,487 B2
APPLICATION NO. : 16/494020
DATED : November 22, 2022
INVENTOR(S) : Laura Rose Vancott Adkins et al.

It is certified that error appears in the above-identified patent and that said Letters Patent is hereby corrected as shown below:

On the Title Page

In Item (56), in Column 2, under "Other Publications", Line 2, delete "(2006." and insert -- (2006). --.

In the Claims

In Column 18, Line 36, in Claim 10, delete "10% 02" and insert -- $\geq 10\%$ $O_2$ --.

Signed and Sealed this
Seventh Day of March, 2023

Katherine Kelly Vidal
*Director of the United States Patent and Trademark Office*